(12) United States Patent
Wang

(10) Patent No.: US 11,031,803 B2
(45) Date of Patent: Jun. 8, 2021

(54) START-UP APPARATUS FOR BATTERY MANAGEMENT CIRCUIT AND BATTERY MANAGEMENT SYSTEM HAVING THE SAME

(71) Applicant: VIA LABS, INC., New Taipei (TW)

(72) Inventor: Tze-Shiang Wang, New Taipei (TW)

(73) Assignee: VIA LABS, INC., New Taipei (TW)

( * ) Notice: Subject to any disclaimer, the term of this patent is extended or adjusted under 35 U.S.C. 154(b) by 317 days.

(21) Appl. No.: 16/006,851

(22) Filed: Jun. 13, 2018

(65) Prior Publication Data
US 2019/0123572 A1  Apr. 25, 2019

Related U.S. Application Data

(60) Provisional application No. 62/574,756, filed on Oct. 20, 2017.

(30) Foreign Application Priority Data

Mar. 20, 2018  (TW) .................................. 107109488

(51) Int. Cl.
*H02J 7/00* (2006.01)
*H02M 1/36* (2007.01)
(Continued)

(52) U.S. Cl.
CPC ............. *H02J 7/0072* (2013.01); *H02M 1/10* (2013.01); *H02M 1/36* (2013.01);
(Continued)

(58) Field of Classification Search
CPC ........... H02J 7/0072; H02M 1/36; H02M 1/10
(Continued)

(56) References Cited

U.S. PATENT DOCUMENTS

| 4,551,666 A * | 11/1985 | Wada ........................ H02J 7/02 320/145 |
| 7,439,708 B2 * | 10/2008 | Aradachi ................ H02J 9/005 320/111 |

(Continued)

FOREIGN PATENT DOCUMENTS

| CN | 1578052 | 2/2005 |
| CN | 1698256 | 11/2005 |

(Continued)

*Primary Examiner* — Richard V Muralidar
(74) *Attorney, Agent, or Firm* — JCIPRNET

(57) ABSTRACT

A start-up apparatus for a battery management circuit and a battery management system having the same are provided. The start-up apparatus for the battery management circuit includes a transformer, a switch circuit, a control circuit, and a rectifier circuit. The transformer includes a primary winding, an auxiliary winding, and a secondary winding. A first terminal of the primary winding is coupled to a first external power path. A first terminal of the switch circuit is coupled to a second terminal of the primary winding, and a second terminal of the switch circuit is coupled to a second external power path. The control circuit is coupled to the auxiliary winding for receiving power and controls a conduction state of the switch circuit. The rectifier circuit is coupled to the secondary winding of the transformer and supplies power to the battery management circuit.

24 Claims, 9 Drawing Sheets

(51) Int. Cl.
  *H02M 1/10* (2006.01)
  *H02M 3/335* (2006.01)
  *H02M 7/06* (2006.01)
  *H02M 1/00* (2006.01)

(52) U.S. Cl.
  CPC ......... *H02M 3/33553* (2013.01); *H02M 7/06* (2013.01); *H02M 2001/0006* (2013.01)

(58) Field of Classification Search
  USPC ........................................ 320/127, 128, 135
  See application file for complete search history.

(56) References Cited

U.S. PATENT DOCUMENTS 7,999,511 B2 * 8/2011 Umetsu ................ H02J 7/0013
  320/128
2005/0007069 A1 * 1/2005 Murakami ............. H02J 7/045
  320/111
2008/0151581 A1 6/2008 Lanni
2011/0185303 A1 7/2011 Katagi et al.

FOREIGN PATENT DOCUMENTS

| | | |
|---|---|---|
| CN | 1949583 | 4/2007 |
| CN | 101164192 | 4/2008 |
| CN | 103210561 | 7/2013 |
| CN | 203331864 | 12/2013 |
| CN | 104348139 | 2/2015 |
| CN | 106998081 | 8/2017 |
| JP | 2010246292 | 10/2010 |
| JP | 5552751 | 7/2014 |
| TW | 201108559 | 3/2011 |
| TW | 201336200 | 9/2013 |
| TW | 201442392 | 11/2014 |
| TW | 201543784 | 11/2015 |

* cited by examiner

START-UP APPARATUS FOR BATTERY MANAGEMENT CIRCUIT AND BATTERY MANAGEMENT SYSTEM HAVING THE SAME

CROSS-REFERENCE TO RELATED APPLICATION

This application claims the priority benefits of U.S. provisional application Ser. No. 62/574,756, filed on Oct. 20, 2017, and Taiwan application serial no. 107109488, filed on Mar. 20, 2018. The entirety of each of the above-mentioned patent applications is hereby incorporated by reference herein and made a part of this specification.

BACKGROUND

Technical Field

The disclosure relates to an electronic apparatus, and more particularly to a start-up apparatus for a battery management circuit and a battery management system.

Description of Related Art

Thanks to the development of technology, reusable rechargeable batteries have been widely used in various electronic devices, such as mobile phones, laptop computers, and electric vehicles, as the power source. However, rechargeable batteries can only store a limited amount of power. When the power of a rechargeable battery is depleted and turns the battery into a dead battery state, the internal circuits of the electronic device, especially the battery management circuit, will not be able to operate normally. The battery management circuit inside the electronic device is used to manage the power amount of the rechargeable battery. When the power amount of the rechargeable battery decreases, the battery management circuit may control a charging switch to allow an external power source (e.g., adapter or charging facility) to charge the rechargeable battery. The operating power of the conventional battery management circuit is supplied only by the rechargeable battery. When the rechargeable battery is in the dead battery state, the conventional battery management circuit cannot operate normally. Since the battery management circuit cannot operate normally, the external power source cannot charge the rechargeable battery. Thus, for the conventional technology, it is required to detach the rechargeable battery in the dead battery state from the electronic device and load the rechargeable battery in the dead battery state into an external special charging device. After the external special charging device finishes charging the rechargeable battery, the rechargeable battery then needs to be removed from the external special charging device to be put back to the electronic device.

In view of the above, it is required to provide a start-up apparatus to solve the problem that the electronic device cannot operate normally due to exhaustion of the power of the internal battery.

SUMMARY

The disclosure provides a start-up apparatus for a battery management circuit and a battery management system that enable the battery management circuit to operate normally when a battery module is in a dead battery state.

According to an embodiment of the disclosure, a start-up apparatus of a battery management circuit is provided. The start-up apparatus of the battery management circuit includes a transformer, a switch circuit, a control circuit, and a rectifier circuit. The transformer includes a primary winding, an auxiliary winding, and a secondary winding. A first terminal of the primary winding is coupled to a first external power path. A first terminal of the switch circuit is coupled to a second terminal of the primary winding, and a second terminal of the switch circuit is coupled to a second external power path. The control circuit is coupled to the auxiliary winding to receive power. The control circuit controls a conduction state of the switch circuit. The rectifier circuit is coupled to the secondary winding of the transformer. The rectifier circuit supplies power to the battery management circuit.

According to an embodiment of the disclosure, a battery management system is provided. The battery management system includes a battery module, a battery management circuit, and a start-up apparatus. The battery management circuit is coupled to the battery module to manage a power amount of the battery module. When the battery module has sufficient power, the battery module supplies power to the battery management circuit. The start-up apparatus is coupled to the battery management circuit. The start-up apparatus includes a transformer, a switch circuit, a control circuit, and a rectifier circuit. The transformer includes a primary winding, an auxiliary winding, and a secondary winding. A first terminal of the primary winding is coupled to a first external power path. A first terminal of the switch circuit is coupled to a second terminal of the primary winding, and a second terminal of the switch circuit is coupled to a second external power path. The control circuit is coupled to the auxiliary winding to receive power. The control circuit controls a conduction state of the switch circuit. The rectifier circuit is coupled to the secondary winding of the transformer. When the battery module does not have sufficient power to supply the battery management circuit, the rectifier circuit supplies power to the battery management circuit.

Based on the above, the battery management system described in the embodiments of the disclosure may supply power to the battery management circuit by the battery module and/or the start-up apparatus. Thus, when the battery module is in a dead battery state, the start-up apparatus may supply power to the battery management circuit to enable the battery management circuit to maintain normal operation.

To make the aforementioned and other features of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
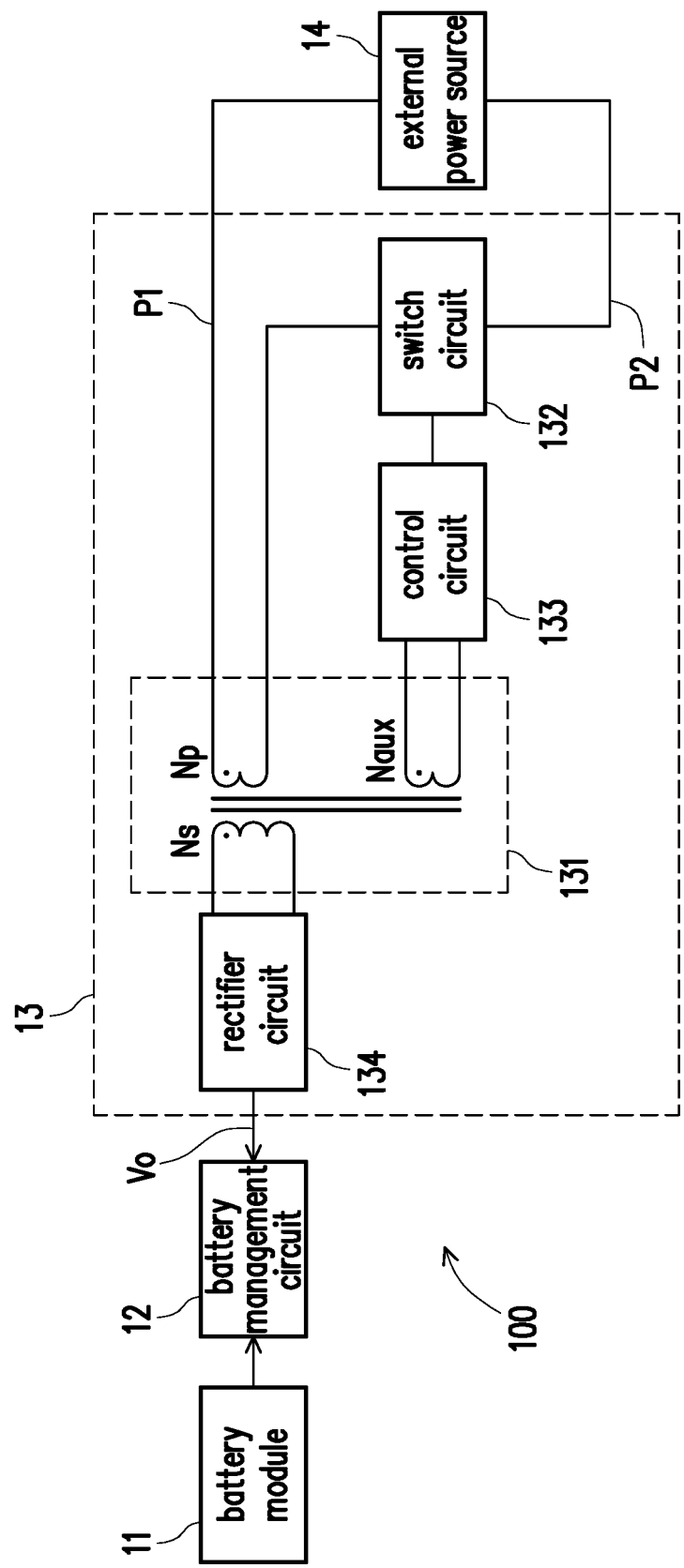
FIG. 1 is a circuit block diagram of the battery management system according to an embodiment of the disclosure.

The term "coupled (or connected)" as used throughout this specification (including the claims) may refer to any direct or indirect connection means. For example, if a first device is described as being coupled (or connected) to a second device, it should be understood that the first device may be directly connected to the second device, or the first device may be indirectly connected to the second device via another device or connection means. Moreover, elements/components/steps with the same reference numerals represent identical or similar parts in the drawings and embodiments wherever possible. Elements/components/steps with the same names or reference numerals in different embodiments may serve as a reference for one another.

FIG. 1 is a circuit block diagram of a battery management system according to an embodiment of the disclosure. As shown in FIG. 1, the battery management system 100 includes a battery module 11, a battery management circuit 12, and a start-up apparatus 13. The battery module 11 may be formed by connecting a plurality of batteries in series. For example, the battery module 11 may include a plurality of lithium batteries or lithium ion batteries. According to the design requirements, the battery module 11 may include conventional batteries or other batteries. The battery management circuit 12 is coupled to the battery module 11. The battery module 11 may supply power to the battery management circuit 12 when the battery module 11 has sufficient power. The battery management circuit 12 may manage the power amount of the battery module 11. When the power amount of the battery module 11 decreases, the battery management circuit 12 may control a charging switch (not shown) to enable an external power source 14 to charge the battery module 11. According to the design requirements, the external power source 14 may include an adapter or other charger infrastructure. In some embodiments, the external power source 14 is detachable from the battery management system 100.

The start-up apparatus 13 is coupled to the battery management circuit 12. In practical applications, the start-up apparatus 13 may be coupled to the external power source 14. In some embodiments, the external power source 14 is detachable from the start-up apparatus 13. In the case where the external power source 14 is connected to a first external power path P1 and a second external power path P2, when the battery module 11 does not have sufficient power to supply the battery management circuit 12, the start-up apparatus 13 may use the external power source 14 to supply power to the battery management circuit 12, so as to enable the battery management circuit 12 to maintain normal operation.

Figure 2:
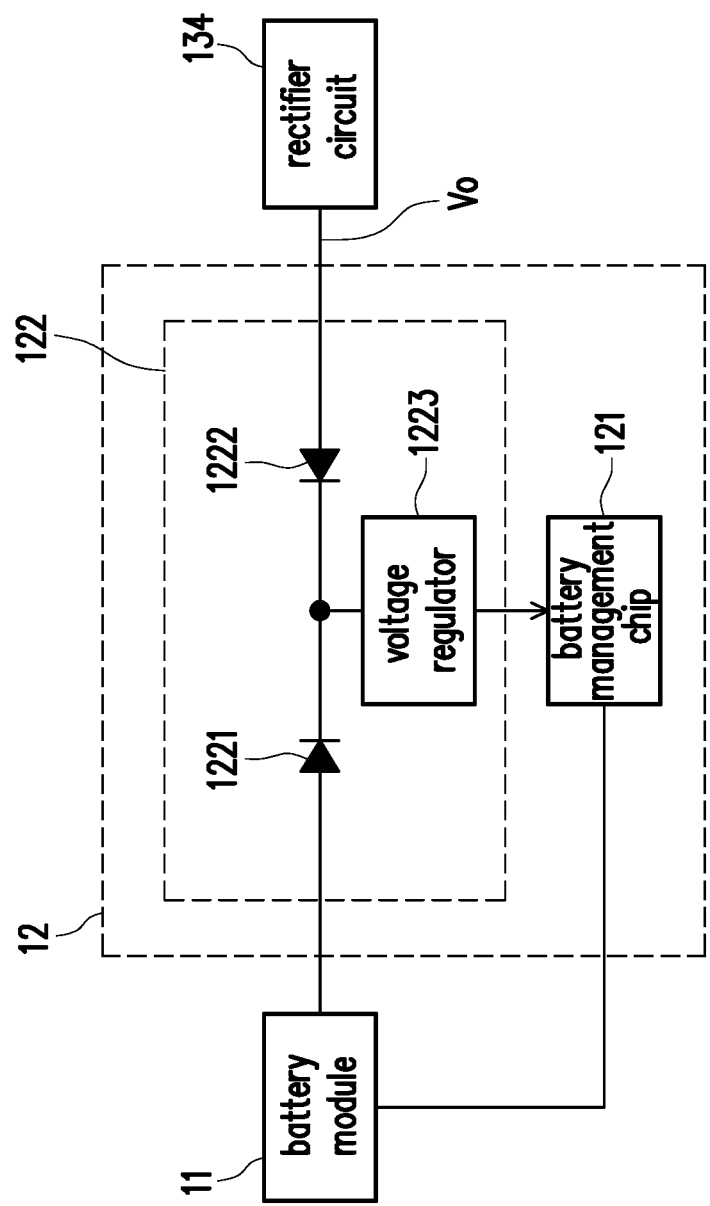
FIG. 2 is a circuit block diagram of the battery management circuit of FIG. 1 according to an embodiment of the disclosure.

FIG. 2 is a circuit block diagram of the battery management circuit 12 of FIG. 1 according to an embodiment of the disclosure. In the embodiment shown in FIG. 2, the battery management circuit 12 includes a battery management chip 121 and a voltage regulation circuit 122. The battery management chip 121 is coupled to the battery module 11 to manage the power amount of the battery module 11. The voltage regulation circuit 122 couples the battery module 11 and a rectifier circuit 134 of the start-up apparatus 13 so as to receive the power provided by the battery module 11 and/or receive the power provided by the rectifier circuit 134. Under normal conditions, the battery module 11 can supply power to the voltage regulation circuit 122. That is, when the battery module 11 has sufficient power, the voltage regulation circuit 122 supplies the power provided by the battery module 11 to the battery management chip 121. When the battery module 11 does not have sufficient power, the voltage regulation circuit 122 may supply the power provided by the rectifier circuit 134 to the battery management chip 121, so as to enable the battery management chip 121 to maintain normal operation.

The details of implementation of the voltage regulation circuit 122 may be determined according to the design requirements. For example, in the embodiment of FIG. 2, the voltage regulation circuit 122 includes a diode 1221, a diode 1222, and a voltage regulator 1223. The input terminal of the voltage regulator 1223 is coupled to the cathode of the diode 1221 and the cathode of the diode 1222. The anode of the diode 1221 is coupled to the battery module 11 to receive power. The anode of the diode 1222 is coupled to the rectifier circuit 134 of the start-up apparatus 13 to receive power. The voltage regulator 1223 may convert the voltage received by the input terminal thereof to an operating voltage required by the battery management chip 121 to be supplied to the battery management chip 121 via the output terminal of the voltage regulator 1223. For example, assuming that the output voltage of the battery module 11 is 64V (for example, the battery module 11 may be formed by connecting 16 4V lithium batteries in series), the voltage regulator 1223 may convert 64V to 5V to be supplied to the battery management chip 121.

Referring to FIG. 1, the start-up apparatus 13 includes a transformer 131, a switch circuit 132, a control circuit 133, and the rectifier circuit 134. The transformer 131 includes a primary winding Np, an auxiliary winding Naux, and a secondary winding Ns. The external power source 14 may transmit power to the start-up apparatus 13 by the first external power path P1 and the second external power path P2. The first terminal of the primary winding Np is coupled to the first external power path P1. The first terminal of the switch circuit 132 is coupled to the second terminal of the primary winding Np, and the second terminal of the switch circuit 132 is coupled to the second external power path P2.

The control circuit 133 is coupled to the auxiliary winding Naux to receive power. That is, when the external power source 14 is electrically connected to the first external power path P1 and the second external power path P2, the power provided by the external power source 14 may be supplied to the control circuit 133 via the transformer 131. The control circuit 133 may control the conduction state of the switch circuit 132. For example, the control circuit 133 may generate a pulse width modulation (PWM) signal to the switch circuit 132. Under the control of the PWM signal, the switch circuit 132 may determine the conduction state between the second external power path P2 and the primary winding Np. Therefore, when the external power source 14 is electrically connected to the first external power path P1 and the second external power path P2, the power provided by the external power source 14 may be supplied to the rectifier circuit 134 via the transformer 131.

The rectifier circuit 134 is coupled to the secondary winding Ns of the transformer 131. The rectifier circuit 134 may convert the AC power of the secondary winding Ns to DC power to be supplied to the battery management circuit 12. If the battery module 11 has sufficient power, the voltage regulation circuit 122 of the battery management circuit 12 may supply the power provided by the battery module 11 to the battery management chip 121 of the battery management circuit 12. If the battery module 11 does not have sufficient power to supply the battery management circuit 12, the rectifier circuit 134 may supply power to the battery management circuit 12. That is, the voltage regulation circuit 122 supplies the power provided by the rectifier circuit 134 to the battery management chip 121.

To sum up, when the battery module 11 does not have sufficient power to supply the battery management circuit 12, the start-up apparatus 13 may be excited to supply the power of the external power source 14 to the battery management circuit 12, so as to enable the battery management circuit 12 to resume normal operation. After the battery management circuit 12 resumes normal operation, the battery management circuit 12 may turn on the charging switch (not shown) to charge the battery module 11 with the power of the external power source 14. Thus, the battery management circuit 12 may directly charge the battery module 11 that is in the dead battery state without detaching the battery module 11 for charging with an external special charging device. Therefore, compared with the related art, in which the battery needs to be detached for charging with an external special charging device and then the charged battery needs to be installed back to the electronic device, the battery management system 100 of this embodiment provides a convenient battery charging method.

Figure 3A:
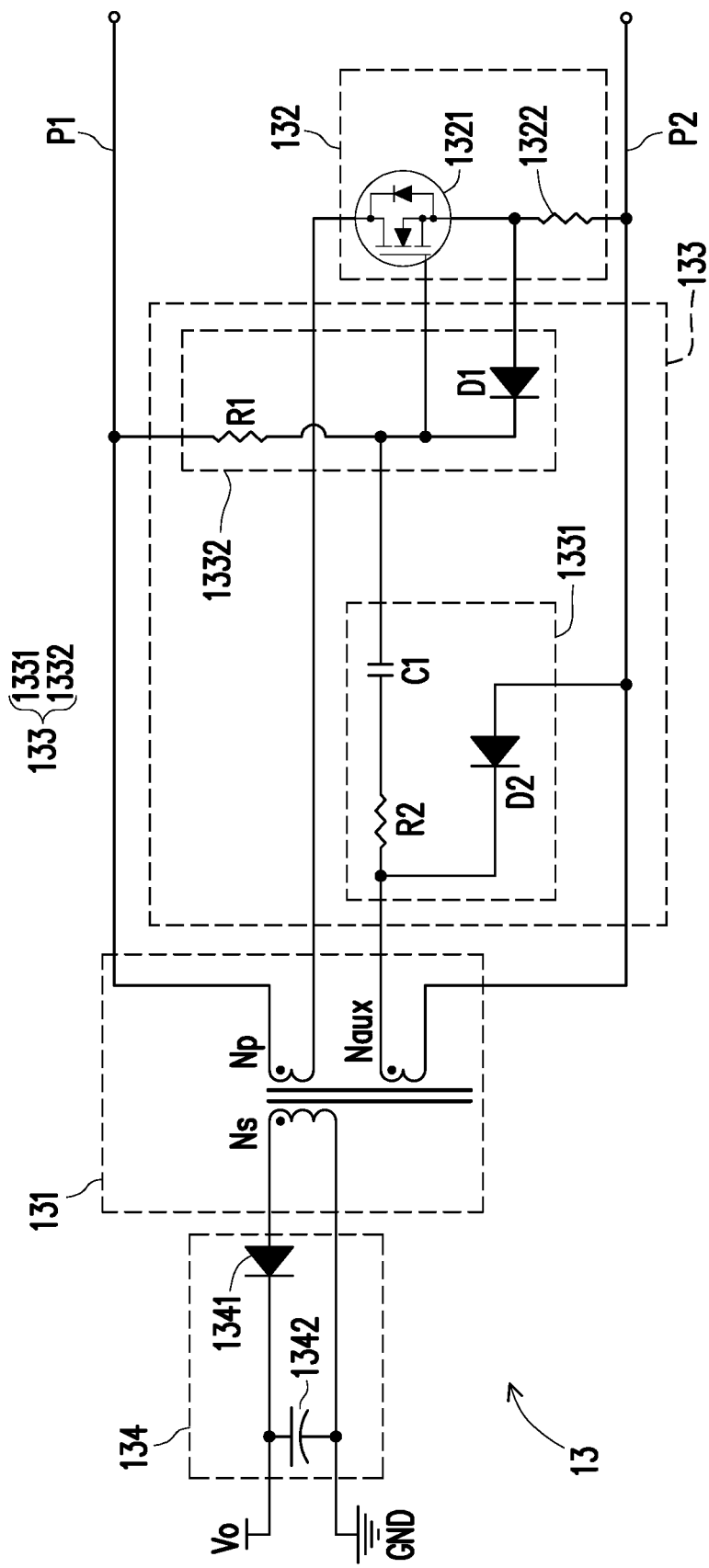
FIG. 3A to FIG. 3C are circuit diagrams of the start-up apparatus of FIG. 1 according to different embodiments of the disclosure.
Figure 3B:
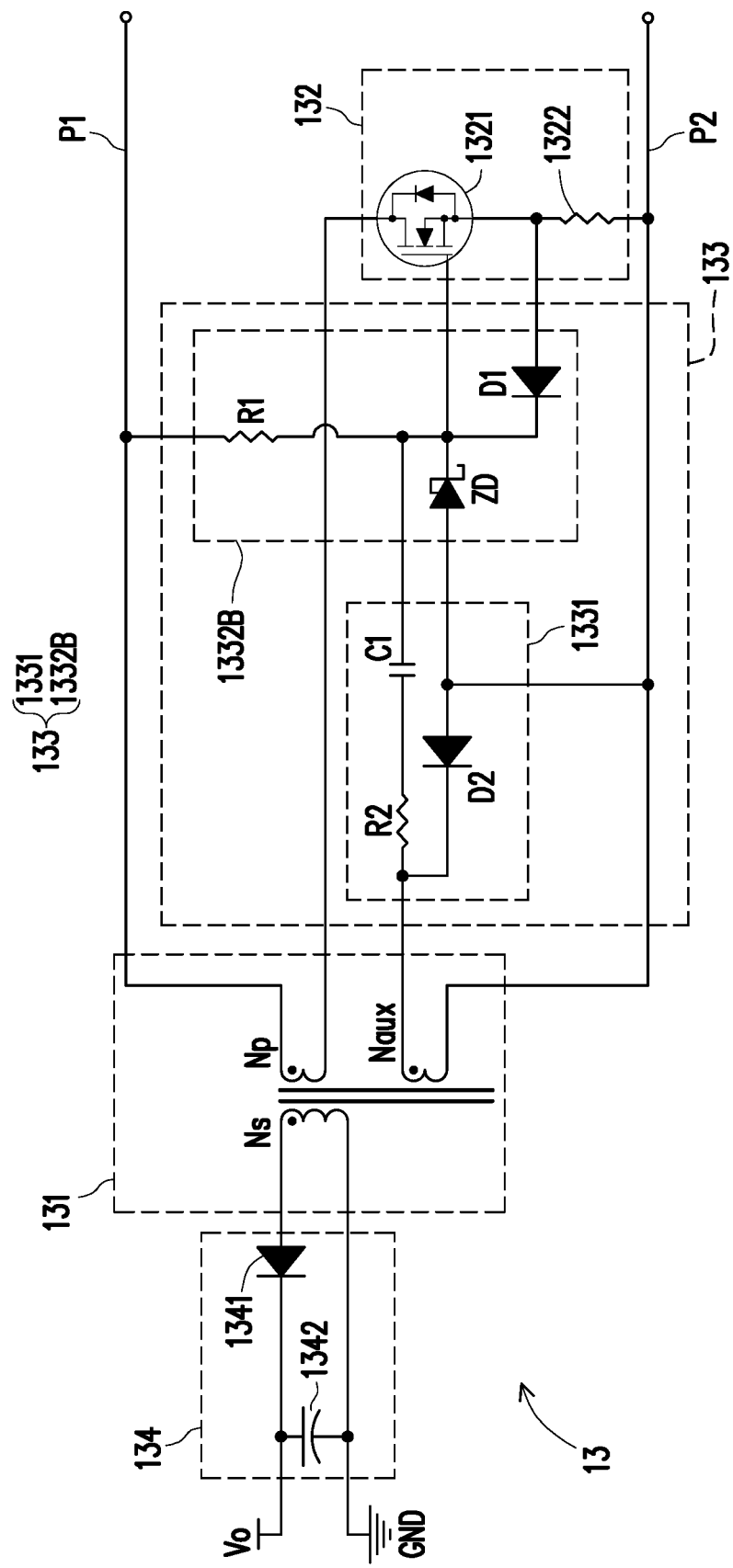
Figure 3C:
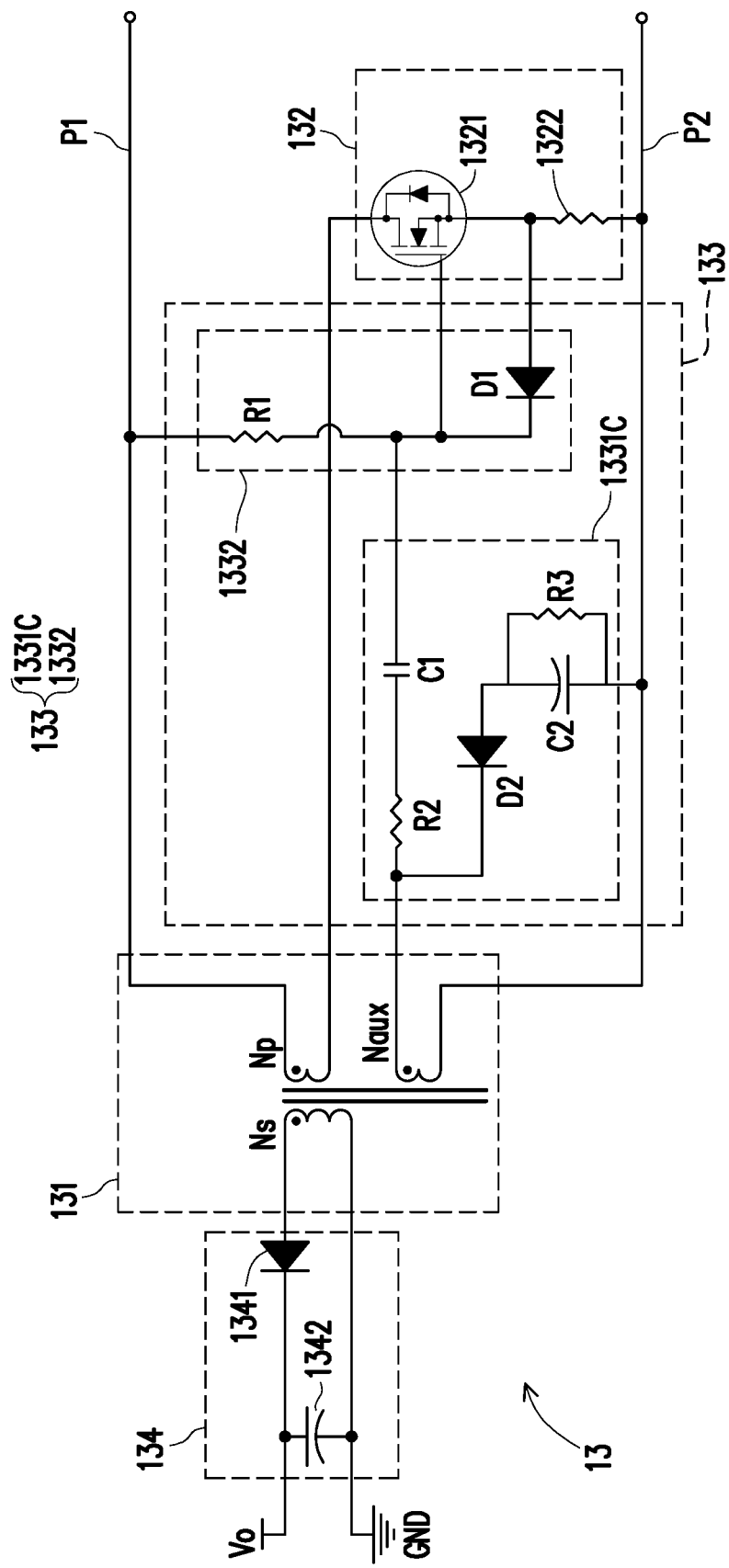

FIG. 3A to FIG. 3C are circuit diagrams of the start-up apparatus 13 of FIG. 1 according to different embodiments of the disclosure. In the embodiment shown in FIG. 3A, the switch circuit 132 includes a power transistor 1321 and a current limiting resistor 1322. According to the design requirements, the power transistor 1321 may be a metal-oxide-semiconductor field-effect transistor (MOSFET), a bipolar junction transistor (BJT), or an insulated gate bipolar transistor (IGBT). In this embodiment, the power transistor 1321 is an N-channel metal oxide semiconductor field-effect transistor (N-MOSFET). The first terminal (for example, drain) of the power transistor 1321 is coupled to the second terminal of the primary winding Np. The control terminal (for example, gate) of the power transistor 1321 is coupled to the control circuit 133. The first terminal of the current limiting resistor 1322 is coupled to the second terminal (for example, source) of the power transistor 1321, and the second terminal of the current limiting resistor 1322 is coupled to the second external power path P2. The current limiting resistor 1322 may limit the current that flows through the power transistor 1321 to prevent damage to the power transistor 1321.

In the embodiment shown in FIG. 3A, the control circuit 133 may include an auxiliary power circuit 1331 and a pulse width modulation (PWM) circuit 1332. The auxiliary power circuit 1331 is coupled to the first terminal of the auxiliary winding Naux of the transformer 131, so as to provide an auxiliary power to the PWM circuit 1332 by using the power of the auxiliary winding Naux. The PWM circuit 1332 is coupled to the auxiliary power circuit 1331 to receive the auxiliary power. The PWM circuit 1332 may generate a pulse signal to the control terminal of the switch circuit 132 to control the conduction state of the switch circuit 132. That is, the PWM circuit 1332 may generate a pulse signal to the control terminal of the power transistor 1321 to control the conduction state of the power transistor 1321.

In the embodiment of FIG. 3A, the PWM circuit 1332 includes a first resistor R1 and a first diode D1. The first terminal of the first resistor R1 is coupled to the first external power path P1. The second terminal of the first resistor R1 is coupled to the control terminal of the power transistor 1321 of the switch circuit 132. The first terminal of the first diode D1 is coupled to the second terminal of the first resistor R1, and the second terminal of the first diode D1 is coupled to the source of the power transistor 1321 of the switch circuit 132. In the embodiment of FIG. 3A, the auxiliary power circuit 1331 includes a second resistor R2, a first capacitor C1, and a second diode D2. The first terminal of the second resistor R2 is coupled to the first terminal of the auxiliary winding Naux. The second terminal of the auxiliary winding Naux is coupled to the second external power path P2. The first terminal of the first capacitor C1 is coupled to the second terminal of the second resistor R2, and the second terminal of the first capacitor C1 is coupled to the second terminal of the first resistor R1. The first terminal (for example, cathode) of the second diode D2 is coupled to the first terminal of the auxiliary winding Naux, and the second terminal (for example, anode) of the second diode D2 is coupled to the second external power path P2.

The power supply performed by the start-up apparatus 13 will be described below with reference to FIG. 3A as an example. In FIG. 3A, the primary winding Np of the transformer 131 may acquire power via the first external power path P1 to generate a current, and the auxiliary winding Naux may sense the current of the primary winding Np to generate an induced voltage, so as to generate an induced current at the auxiliary winding Naux. Therefore, the auxiliary winding Naux may supply power to the auxiliary power circuit 1331. The auxiliary power circuit 1331 may use the power of the auxiliary winding Naux to provide the auxiliary power. After receiving the auxiliary power, the PWM circuit 1332 may generate a pulse signal to the switch circuit 132, so as to control the conduction state of the power transistor 1321 of the switch circuit 132. Under the control of the pulse signal, the power transistor 1321 may determine the conduction state between the second external power path P2 and the primary winding Np. As the modulation frequency of the pulse signal increases, the switching operation of the power transistor 1321 becomes more frequent, which causes the magnetic flux of the primary winding Np of the transformer 131 to change. Therefore, when the external power source 14 is electrically connected to the first external power path P1 and the second external power path P2, the power provided by the external power source 14 may be transmitted to the secondary winding Ns via the primary winding Np of the transformer 131 and cause an induced current to be generated at the secondary winding Ns. The induced current of the secondary winding Ns is then rectified and filtered by the rectifier circuit 134 to generate the output voltage Vo for supplying power to the battery management circuit 12 in FIG. 1.

In the embodiment of FIG. 3A, the rectifier circuit 134 may include a diode 1341 and a capacitor 1342. The anode of the diode 1341 is coupled to the first terminal of the secondary winding Ns of the transformer 131. The cathode of the diode 1341 generates an output voltage Vo to the battery management circuit 12. The first terminal of the capacitor 1342 is coupled to the cathode of the diode 1341. The negative terminal of the capacitor 1342 and the second terminal of the secondary winding Ns are coupled to a reference voltage (for example, ground voltage GND). In addition, the output voltage Vo of the rectifier circuit 134 may be adjusted according to the ratio of the number of turns of the primary winding Np to the number of turns of the secondary winding Ns of the transformer 131.

FIG. 3B is a circuit diagram of the start-up apparatus 13 of FIG. 1 according to another embodiment of the disclosure. The transformer 131, the switch circuit 132, the control circuit 133, and the rectifier circuit 134 shown in FIG. 3B may be implemented by referring to the descriptions of FIG. 3A and therefore details thereof will not be repeated hereinafter. In the embodiment shown in FIG. 3B, the control circuit 133 of the start-up apparatus 13 is provided with an auxiliary power circuit 1331 and a PWM circuit 1332B. The auxiliary power circuit 1331 and the PWM circuit 1332B shown in FIG. 3B may be implemented by referring to the descriptions of the auxiliary power circuit 1331 and the PWM circuit 1332 shown in FIG. 3A and therefore details thereof will not be repeated hereinafter. Unlike the PWM circuit 1332 of FIG. 3A, the PWM circuit 1332B of FIG. 3B further includes a Zener diode ZD. The first terminal (for example, cathode) of the Zener diode ZD is coupled to the second terminal of the first resistor R1, and the second terminal (for example, anode) of the Zener diode ZD is coupled to the second external power path P2. The Zener diode ZD helps to maintain a stable bias voltage between the gate and the source of the power transistor 1321, so as to protect the power transistor 1321 from a surge current or static electricity. The power supply performed by the start-up apparatus 13 in FIG. 3B may be understood by referring to the descriptions of FIG. 3A and therefore details thereof will not be repeated hereinafter.

FIG. 3C is a circuit diagram of the start-up apparatus 13 of FIG. 1 according to yet another embodiment of the disclosure. The transformer 131, the switch circuit 132, the control circuit 133, and the rectifier circuit 134 shown in FIG. 3C may be implemented by referring to the descriptions of FIG. 3A and therefore details thereof will not be repeated hereinafter. In the embodiment shown in FIG. 3C, the control circuit 133 of the start-up apparatus 13 is provided with an auxiliary power circuit 1331C and a PWM circuit 1332. The auxiliary power circuit 1331C and the PWM circuit 1332 shown in FIG. 3C may be implemented by referring to the descriptions of the auxiliary power circuit 1331 and the PWM circuit 1332 shown in FIG. 3A and therefore details thereof will not be repeated hereinafter. Unlike the auxiliary power circuit 1331 of FIG. 3A, the auxiliary power circuit 1331C of FIG. 3C further includes a second capacitor C2 and a third resistor R3. As shown in FIG. 3C, the first terminal of the second capacitor C2 is coupled to the second terminal (for example, anode) of the second diode D2, and the second terminal of the second capacitor C2 is coupled to the second external power path P2. The first terminal of the third resistor R3 is coupled to the second terminal of the second diode D2, and the second terminal of the third resistor R3 is coupled to the second external power path P2. In the auxiliary power circuit 1331C of FIG. 3C, the second capacitor C2 and the third resistor R3 may provide a longer discharge path for the power transistor 1321. The power supply performed by the start-up apparatus 13 in FIG. 3C may be understood by referring to the descriptions of FIG. 3A and therefore details thereof will not be repeated hereinafter.

Figure 4:
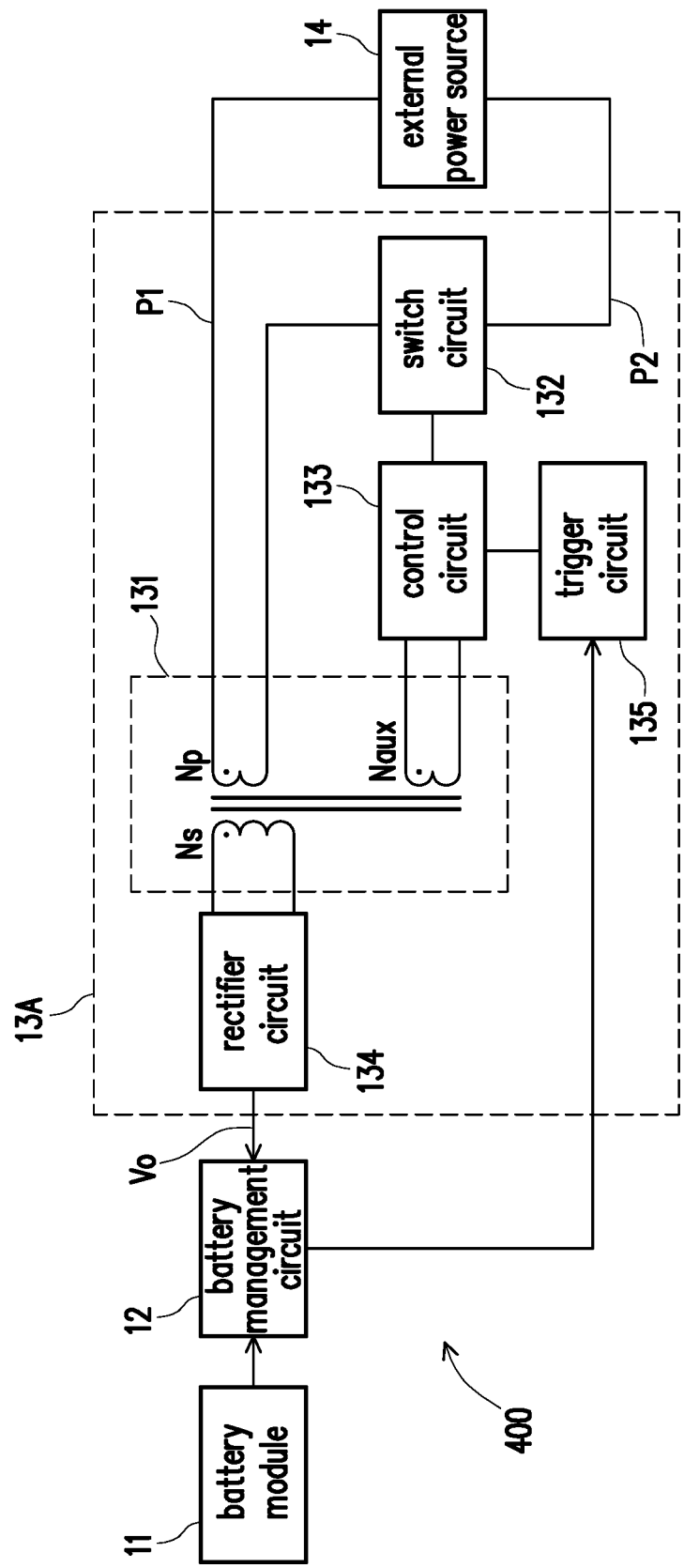
FIG. 4 is a circuit block diagram of the battery management system according to another embodiment of the disclosure.

FIG. 4 is a circuit block diagram of the battery management system according to another embodiment of the disclosure. As shown in FIG. 4, the battery management system 400 includes a battery module 11, a battery management circuit 12, and a start-up apparatus 13A. The battery module 11, the battery management circuit 12, and the start-up apparatus 13A shown in FIG. 4 may be implemented by referring to the descriptions of the battery module 11, the battery management circuit 12, and the start-up apparatus 13 shown in FIG. 1 and therefore details thereof will not be repeated hereinafter. Unlike the start-up apparatus 13 of FIG. 1, the start-up apparatus 13A of FIG. 4 further includes a trigger circuit 135. The trigger circuit 135 is coupled to the control circuit 133 and the battery management circuit 12. The trigger circuit 135 determines whether to disable the control circuit 133 according to a control command of the battery management circuit 12.

Figure 5:
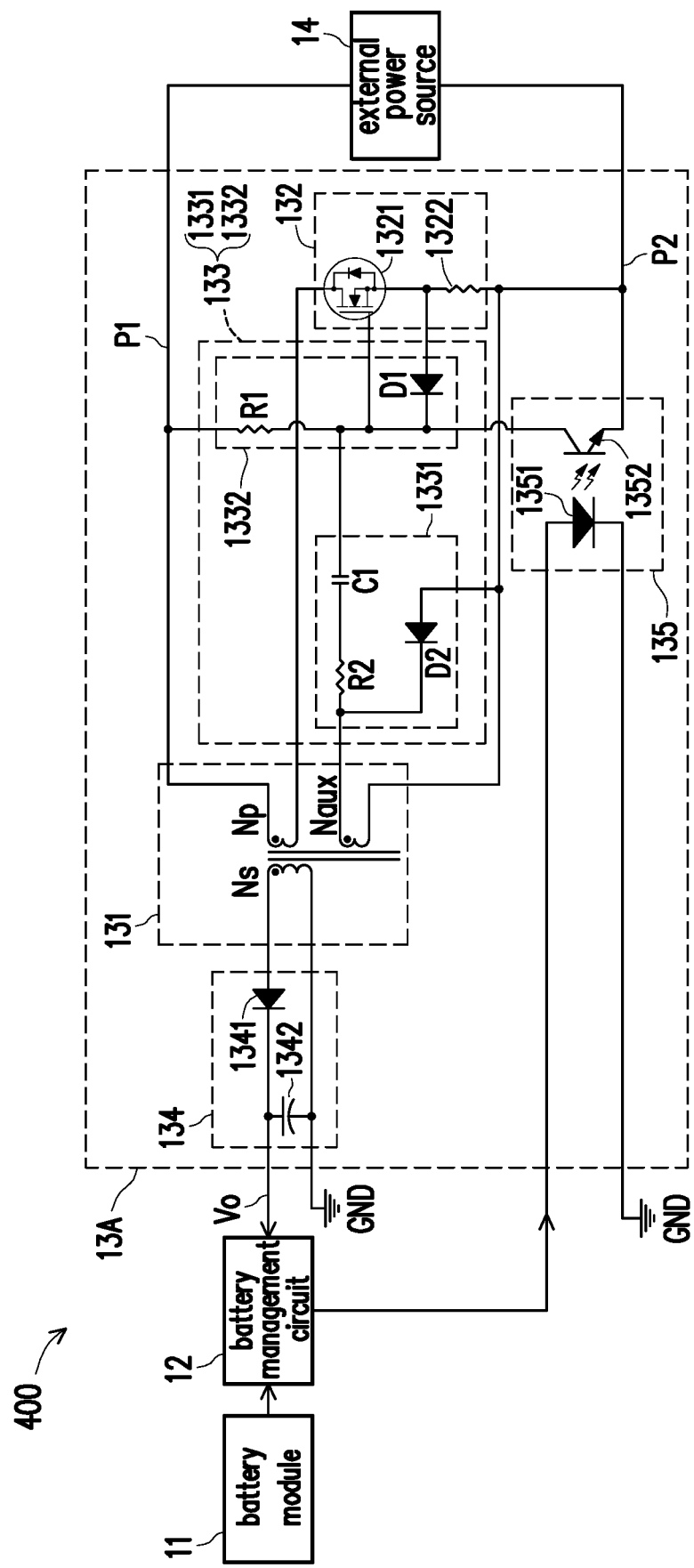
FIG. 5 is a circuit block diagram of the battery management system of FIG. 4 according to an embodiment of the disclosure.

For example, FIG. 5 is a circuit diagram of the start-up apparatus 13A of FIG. 4 according to an embodiment of the disclosure. As shown in FIG. 5, the start-up apparatus 13A includes a transformer 131, a switch circuit 132, a control circuit 133, a rectifier circuit 134, and a trigger circuit 135. The control circuit 133 is provided with an auxiliary power circuit 1331 and a PWM circuit 1332. The transformer 131, the switch circuit 132, the control circuit 133, the auxiliary power circuit 1331, the PWM circuit 1332, and the rectifier circuit 134 shown in FIG. 5 may be implemented by referring to the descriptions of FIG. 3A and therefore details thereof will not be repeated hereinafter. The trigger circuit 135 is coupled to the PWM circuit 1332.

In the embodiment of FIG. 5, the trigger circuit 135 may include a photocoupler. For example, a light emitting part 1351 of the photocoupler may be a light emitting diode, and a light receiving part 1352 of the photocoupler may be a phototransistor. The first terminal of the light emitting part 1351 of the photocoupler is coupled to the battery management circuit 12. The second terminal of the light emitting part 1351 of the photocoupler is coupled to a reference voltage (for example, ground voltage). The first terminal of the light receiving part 1352 of the photocoupler is coupled to the PWM circuit 1332 of the control circuit 133, and the second terminal of the light receiving part 1352 is coupled to the second external power path P2. When the battery module 11 does not have sufficient power to supply the battery management circuit 12, the battery management circuit 12 does not operate normally. At this time, the light receiving part 1352 (phototransistor) of the photocoupler is turned off. The operation performed by the start-up apparatus 13A shown in FIG. 5 when the light receiving part 1352 (phototransistor) is turned off may be understood by referring to the descriptions of the start-up apparatus 13 shown in FIG. 3A and therefore details thereof will not be repeated hereinafter. Thus, when the battery module 11 does not have sufficient power to supply the battery management circuit 12, the start-up apparatus 13A may provide the power of the external power source 14 to the battery management circuit 12, so as to enable the battery management circuit 12 to resume normal operation. After the battery management circuit 12 resumes normal operation, the battery management circuit 12 may turn on the charging switch (not shown) for the external power source 14 to charge the battery module 11. Therefore, the battery module 11 is not in the dead battery state and may supply power to the battery management circuit 12.

In the case where the battery module 11 has sufficient power to supply the battery management circuit 12, the battery management circuit 12 may send a control command to the trigger circuit 135, so as to disable the PWM circuit 1332 of the control circuit 133. For example, the battery management circuit 12 may provide a driving current to enable the light emitting part 1351 (light emitting diode) of the photocoupler to emit light, which turns on the light receiving part 1352 (phototransistor) of the photocoupler. When the light receiving part 1352 (phototransistor) is turned on, the gate of the power transistor 1321 of the switch circuit 132 is kept at a low potential. That is, the power transistor 1321 is kept in the off state. Therefore, in the case where the battery module 11 has sufficient power to supply the battery management circuit 12, the start-up apparatus 13A may stop supplying power to the battery management circuit 12 under the control of the battery management circuit 12.

Figure 6:
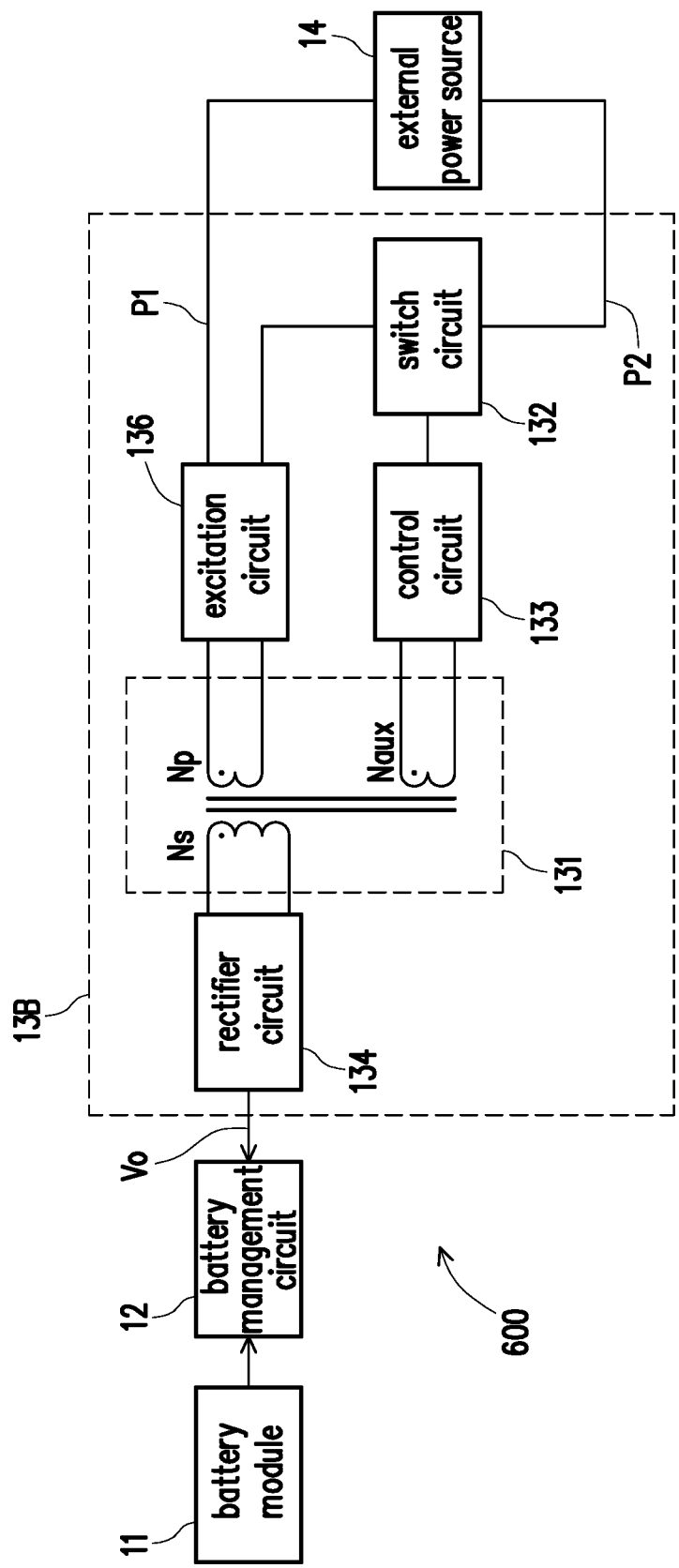
FIG. 6 is a circuit block diagram of the battery management system according to yet another embodiment of the disclosure.

FIG. 6 is a circuit block diagram of the battery management system according to yet another embodiment of the disclosure. As shown in FIG. 6, the battery management system 600 includes a battery module 11, a battery management circuit 12, and a start-up apparatus 13B. The battery module 11, the battery management circuit 12, and the start-up apparatus 13B shown in FIG. 6 may be implemented by referring to the descriptions of the battery module 11, the battery management circuit 12, and the start-up apparatus 13 shown in FIG. 1 and therefore details thereof will not be repeated hereinafter. Unlike the start-up apparatus 13 of FIG. 1, the start-up apparatus 13B of FIG. 6 further includes an excitation circuit 136. The first terminal of the excitation circuit 136 is coupled to the first terminal of the primary winding Np of the transformer 131, and the second terminal of the excitation circuit 136 is coupled to the second terminal of the primary winding Np. The excitation circuit 136 may increase an excitation current generated by the primary winding Np of the transformer 131, so as to increase the power conversion efficiency of the transformer 131 from the primary winding Np to the secondary winding Ns.

When the battery module 11 does not have sufficient power to supply the battery management circuit 12, the start-up apparatus 13B may accelerate the excitation by the excitation circuit 136 to supply the power of the external power source 14 to the battery management circuit 12, so as to enable the battery management circuit 12 to resume normal operation. After the battery management circuit 12 resumes normal operation, the battery management circuit 12 may turn on the charging switch (not shown) to charge the battery module 11 with the power of the external power source 14. Thus, the battery management circuit 12 may directly charge the battery module 11 that is in the dead battery state without detaching the battery module 11 for charging with an external special charging device. Therefore, compared with the related art, in which the battery needs to be detached for charging with an external special charging device and then the charged battery needs to be installed back to the electronic device, the battery management system 600 of this embodiment provides a convenient battery charging method.

Figure 7:
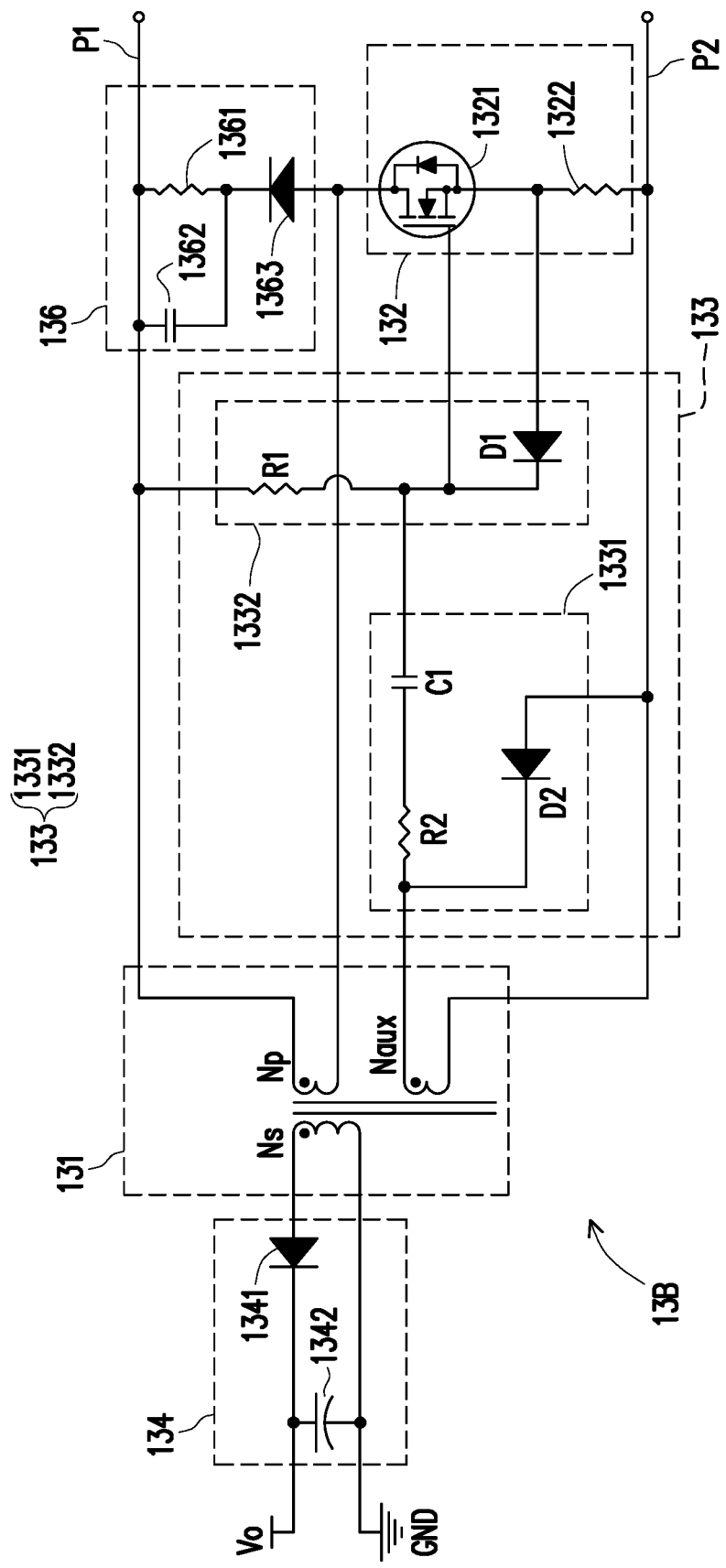
FIG. 7 is a circuit diagram of the start-up apparatus of FIG. 6 according to an embodiment of the disclosure.

For example, FIG. 7 is a circuit diagram of the start-up apparatus 13B of FIG. 6 according to an embodiment of the disclosure. As shown in FIG. 7, the start-up apparatus 13B includes a transformer 131, a switch circuit 132, a control circuit 133, a rectifier circuit 134, and an excitation circuit 136. The transformer 131, the switch circuit 132, the control circuit 133, and the rectifier circuit 134 shown in FIG. 7 may be implemented by referring to the descriptions of FIG. 3A and therefore details thereof will not be repeated hereinafter. In the embodiment shown in FIG. 7, the excitation circuit 136 includes a resistor 1361, a capacitor 1362, and a diode 1363. The first terminal of the resistor 1361 and the first terminal of the capacitor 1362 are both coupled to the first terminal of the primary winding Np of the transformer 131. The first terminal (for example, cathode) of the diode 1363 is coupled to the second terminal of the resistor 1361 and the second terminal of the capacitor 1362, and the second terminal (for example, anode) of the diode 1363 is coupled to the second terminal of the primary winding Np of the transformer 131.

The resistor 1361, the capacitor 1362, and the diode 1363 in the excitation circuit 136 may increase the current path of the primary winding Np of the transformer 131 to enhance the excitation current of the primary winding Np. Therefore, the power conversion efficiency between the primary winding Np and the secondary winding Ns of the transformer 131 is improved. The operations of the transformer 131, the switch circuit 132, the control circuit 133, and the rectifier circuit 134 shown in FIG. 7 may be understood by referring to the descriptions of FIG. 3A and therefore details thereof will not be repeated hereinafter.

In conclusion, the battery management system described in the embodiments of the disclosure may supply power to the battery management circuit by the battery module and may also supply external power to the battery management circuit by the start-up apparatus. Thus, when the battery module is in the dead battery state, the start-up apparatus may serve as the power source of the battery management circuit to enable the battery management circuit to maintain/resume normal operation. Therefore, even if the battery module is unable to supply power to the battery management circuit, the battery management system can still charge the battery module that is in the dead battery state without detaching the battery module. In addition, disposing the excitation circuit in the start-up apparatus effectively improves the power conversion efficiency of the transformer and further enhances the power supply efficiency of the start-up apparatus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A start-up apparatus of a battery management circuit, the start-up apparatus comprising:
   a transformer comprising a primary winding, an auxiliary winding, and a secondary winding, wherein a first terminal of the primary winding is coupled to a first external power path;
   a switch circuit, wherein a first terminal of the switch circuit is coupled to a second terminal of the primary winding, and a second terminal of the switch circuit is coupled to a second external power path;
   a control circuit coupled to the auxiliary winding to receive power, wherein the control circuit controls a conduction state of the switch circuit; and
   a rectifier circuit coupled to the secondary winding of the transformer, wherein the rectifier circuit supplies power to the battery management circuit,
   wherein the start-up apparatus is supplied with power from an external power source through the first external power path and the second external power path.

2. The start-up apparatus according to claim 1, wherein the switch circuit comprises:

a power transistor, wherein a first terminal of the power transistor is coupled to the second terminal of the primary winding, and a control terminal of the power transistor is coupled to the control circuit; and a current limiting resistor, wherein a first terminal of the current limiting resistor is coupled to a second terminal of the power transistor, and a second terminal of the current limiting resistor is coupled to the second external power path.

3. The start-up apparatus according to claim 1, wherein the control circuit comprises:

an auxiliary power circuit, coupled to a first terminal of the auxiliary winding of the transformer, configured to provide an auxiliary power by using power of the auxiliary winding; and a pulse width modulation circuit coupled to the auxiliary power circuit to receive the auxiliary power, so as to generate a pulse signal to a control terminal of the switch circuit to control the conduction state of the switch circuit.

4. The start-up apparatus according to claim 3, wherein the pulse width modulation circuit comprises:

a first resistor, wherein a first terminal of the first resistor is coupled to the first external power path, and a second terminal of the first resistor is coupled to a control terminal of a power transistor of the switch circuit; and a first diode, wherein a first terminal of the first diode is coupled to the second terminal of the first resistor, and a second terminal of the first diode is coupled to a source of the switch circuit.

5. The start-up apparatus according to claim 4, wherein the pulse width modulation circuit further comprises:

a Zener diode, wherein a first terminal of the Zener diode is coupled to the second terminal of the first resistor, and a second terminal of the Zener diode is coupled to the second external power path.

6. The start-up apparatus according to claim 4, wherein the auxiliary power circuit comprises:

a second resistor, wherein a first terminal of the second resistor is coupled to the first terminal of the auxiliary winding, and a second terminal of the auxiliary winding is coupled to the second external power path;

a first capacitor, wherein a first terminal of the first capacitor is coupled to a second terminal of the second resistor, and a second terminal of the first capacitor s coupled to the second terminal of the first resistor; and a second diode, wherein a first terminal of the second diode is coupled to the first terminal of the auxiliary winding, and a second terminal of the second diode is coupled to the second external power path.

7. The start-up apparatus according to claim 4, wherein the auxiliary power circuit comprises:

a second resistor, wherein a first terminal of the second resistor is coupled to the first terminal of the auxiliary winding, and a second terminal of the auxiliary winding is coupled to the second external power path;

a first capacitor, wherein a first terminal of the first capacitor is coupled to a second terminal of the second resistor, and a second terminal of the first capacitor is coupled to the second terminal of the first resistor;

a second diode, wherein a first terminal of the second diode is coupled to the first terminal of the auxiliary winding;

a second capacitor, wherein a first terminal of the second capacitor is coupled to a second terminal of the second diode, and a second terminal of the second capacitor is coupled to the second external power path; and a third resistor, wherein a first terminal of the third resistor is coupled to the second terminal of the second diode, and a second terminal of the third resistor is coupled to the second external power path.

8. The start-up apparatus according to claim 1, further comprising:

a trigger circuit coupled to the control circuit, wherein the trigger circuit determines whether to disable the control circuit according to a control command of the battery management circuit.

9. The start-up apparatus according to claim 8, wherein the trigger circuit comprises:

a photocoupler, wherein a light emitting part of the photocoupler is coupled to the battery management circuit, a first terminal of a light receiving part of the photocoupler is coupled to the control circuit, and a second terminal of the light receiving part is coupled to the second external power path.

10. The start-up apparatus according to claim 1, further comprising:

an excitation circuit, wherein a first terminal of the excitation circuit is coupled to the first terminal of the primary winding, and a second terminal of the excitation circuit is coupled to the second terminal of the primary winding.

11. The start-up apparatus according to claim 10, wherein the excitation circuit comprises:

a resistor, wherein a first terminal of the resistor is coupled to the first terminal of the primary winding;

a capacitor, wherein a first terminal of the capacitor is coupled to the first terminal of the primary winding; and a diode, wherein a first terminal of the diode is coupled to a second terminal of the resistor and a second terminal of the capacitor, and a second terminal of the diode is coupled to the second terminal of the primary winding.

12. A battery management system, comprising:

a battery module;

a battery management circuit coupled to the battery module to manage a power amount of the battery module, wherein the battery module supplies power to the battery management circuit when the battery module has sufficient power to supply the battery management circuit; and a start-up apparatus coupled to the battery management circuit, wherein the start-up apparatus comprises:

a transformer comprising a primary winding, an auxiliary winding, and a secondary winding, wherein a first terminal of the primary winding is coupled to a first external power path;

a switch circuit, wherein a first terminal of the switch circuit is coupled to a second terminal of the primary winding, and a second terminal of the switch circuit is coupled to a second external power path;

a control circuit coupled to the auxiliary winding to receive power, wherein the control circuit controls a conduction state of the switch circuit; and a rectifier circuit coupled to the secondary winding of the transformer, wherein the rectifier circuit supplies power to the battery management circuit when the battery module does not have sufficient power to supply the battery management circuit.

13. The battery management system according to claim 12, wherein the battery management circuit comprises:

a battery management chip coupled to the battery module to manage the power amount of the battery module; and a voltage regulation circuit coupled to the battery module to receive power, wherein the voltage regulation circuit supplies power to the battery management chip by using power provided from the battery module when the battery module has sufficient power, and the voltage regulation circuit supplies power to the battery management chip by using power provided from the rectifier circuit when the battery module does not have sufficient power.

14. The battery management system according to claim 13, wherein the voltage regulation circuit comprises:
   a first diode, wherein an anode of the first diode is coupled to the battery module to receive power;
   a second diode, wherein an anode of the second diode is coupled to the rectifier circuit to receive power; and
   a voltage regulator, wherein an input terminal of the voltage regulator is coupled to a cathode of the first diode and a cathode of the second diode, and an output terminal of the voltage regulator supplies power to the battery management chip.

15. The battery management system according to claim 12, wherein the switch circuit comprises:
   a power transistor, wherein a first terminal of the power transistor is coupled to the second terminal of the primary winding, and a control terminal of the power transistor is coupled to the control circuit; and
   a current limiting resistor, wherein a first terminal of the current limiting resistor is coupled to a second terminal of the power transistor, and a second terminal of the current limiting resistor is coupled to the second external power path.

16. The battery management system according to claim 12, wherein the control circuit comprises:
   an auxiliary power circuit, coupled to a first terminal of the auxiliary winding of the transformer, configured to provide an auxiliary power by using power of the auxiliary winding; and
   a pulse width modulation circuit coupled to the auxiliary power circuit to receive the auxiliary power, so as to generate a pulse signal to a control terminal of the switch circuit to control the conduction state of the switch circuit.

17. The battery management system according to claim 16, wherein the pulse width modulation circuit comprises:
   a first resistor, wherein a first terminal of the first resistor is coupled to the first external power path, and a second terminal of the first resistor is coupled to a control terminal of a power transistor of the switch circuit; and
   a first diode, wherein a first terminal of the first diode is coupled to the second terminal of the first resistor, and a second terminal of the first diode is coupled to a source of the switch circuit.

18. The battery management system according to claim 17, wherein the pulse width modulation circuit further comprises:
   a Zener diode, wherein a first terminal of the Zener diode is coupled to the second terminal of the first resistor, and a second terminal of the Zener diode is coupled to the second external power path.

19. The battery management system according to claim 17, wherein the auxiliary power circuit comprises:
   a second resistor, wherein a first terminal of the second resistor is coupled to the first terminal of the auxiliary winding, and a second terminal of the auxiliary winding is coupled to the second external power path;
   a first capacitor, wherein a first terminal of the first capacitor is coupled to a second terminal of the second resistor, and a second terminal of the first capacitor is coupled to the second terminal of the first resistor; and
   a second diode, wherein a first terminal of the second diode is coupled to the first terminal of the auxiliary winding, and a second terminal of the second diode is coupled to the second external power path.

20. The battery management system according to claim 17, wherein the auxiliary power circuit comprises:
   a second resistor, wherein a first terminal of the second resistor is coupled to the first terminal of the auxiliary winding, and a second terminal of the auxiliary winding is coupled to the second external power path;
   a first capacitor, wherein a first terminal of the first capacitor is coupled to a second terminal of the second resistor, and a second terminal of the first capacitor is coupled to the second terminal of the first resistor;
   a second diode, wherein a first terminal of the second diode is coupled to the first terminal of the auxiliary winding;
   a second capacitor, wherein a first terminal of the second capacitor is coupled to a second terminal of the second diode, and a second terminal of the second capacitor is coupled to the second external power path; and
   a third resistor, wherein a first terminal of the third resistor is coupled to the second terminal of the second diode, and a second terminal of the third resistor is coupled to the second external power path.

21. The battery management system according to claim 12, further comprising:
   a trigger circuit coupled to the control circuit, wherein the trigger circuit determines whether to disable the control circuit according to a control command of the battery management circuit.

22. The battery management system according to claim 21, wherein the trigger circuit comprises:
   a photocoupler, wherein a light emitting part of the photocoupler is coupled to the battery management circuit, a first terminal of a light receiving part of the photocoupler is coupled to the control circuit, and a second terminal of the light receiving part is coupled to the second external power path.

23. The battery management system according to claim 12, further comprising:
   an excitation circuit, wherein a first terminal of the excitation circuit is coupled to the first terminal of the primary winding, and a second terminal of the excitation circuit is coupled to the second terminal of the primary winding.

24. The battery management system according to claim 23, wherein the excitation circuit comprises:
   a resistor, wherein a first terminal of the resistor is coupled to the first terminal of the primary winding;
   a capacitor, wherein a first terminal of the capacitor is coupled to the first terminal of the primary winding; and
   a diode, wherein a first terminal of the diode is coupled to a second terminal of the resistor and a second terminal of the capacitor, and a second terminal of the diode is coupled to the second terminal of the primary winding.

* * * * *